United States Patent
Karp

(10) Patent No.: US 7,362,865 B2
(45) Date of Patent: Apr. 22, 2008

(54) WIRELESS NETWORK SYSTEM

(75) Inventor: Alan H. Karp, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 985 days.

(21) Appl. No.: 10/122,511

(22) Filed: Apr. 15, 2002

(65) Prior Publication Data

US 2003/0196115 A1 Oct. 16, 2003

(51) Int. Cl.
*H04L 9/00* (2006.01)
(52) U.S. Cl. .................................................. 380/270
(58) Field of Classification Search ............ 713/155, 713/166; 726/3; 380/247, 270
See application file for complete search history.

(56) References Cited

U.S. PATENT DOCUMENTS

| | | | |
|---|---|---|---|
| 6,427,174 B1 * | 7/2002 | Sitaraman et al. | 709/245 |
| 6,704,789 B1 * | 3/2004 | Ala-Laurila et al. | 709/230 |
| 6,754,820 B1 * | 6/2004 | Scheidt et al. | 713/166 |
| 6,792,474 B1 * | 9/2004 | Hopprich et al. | 709/245 |
| 6,834,341 B1 * | 12/2004 | Bahl et al. | 713/156 |
| 2002/0152380 A1 * | 10/2002 | O'Shea et al. | 713/170 |
| 2002/0152384 A1 * | 10/2002 | Shelest et al. | 713/176 |
| 2003/0222819 A1 * | 12/2003 | Karr et al. | 342/457 |

* cited by examiner

*Primary Examiner*—Matthew Smithers
*Assistant Examiner*—Ali S Abyaneh

(57) ABSTRACT

A wireless network system provides for a wireless access point. The wireless access point is configured to receive data, from a wireless computing device, that is encrypted using encryption key data and to determine if the encryption key data corresponds to a home computing device or a visitor computing device. An IP address is assigned to the wireless computing device to identify it on the network system. The IP address is assigned based upon the encryption key data.

24 Claims, 7 Drawing Sheets

US 7,362,865 B2

WIRELESS NETWORK SYSTEM

TECHNICAL FIELD

The present invention is generally related to a wireless network and, more particularly, is related to a system and method for granting network access to a visiting wireless computing device.

BACKGROUND OF THE INVENTION

Wireless networks and wireless computing devices, such as personal digital assistants (PDA) and the like are growing in popularity. Many businesses/homes today have wireless computer networks in place that allow users of wireless computing devices that are connected to the network to access resources on the network such as e-mail, the Internet and data stored on memory devices connected to the network.

As the use of wireless computing devices increases, the desire of wireless computing device users to access such things as e-mail via a wireless network while, for example, visiting a client's business site, has also increased. Typical wireless networks have security measures in place that allow only a user device with permission to access the network. These security measures typically involve encrypting data that is transmitted by a wireless device to the wireless network with a predetermined encryption key. The wireless network receives the data and decrypts the data using the same predetermined encryption key. The wireless device is then able to access the network and be recognized as a user device that has permission to access the network. In order to allow a visiting user to have access to the network via their wireless computing device (visiting device), it is necessary for the network owner to provide the encryption key to the visiting user/visiting device so that data transmitted from the wireless device is encrypted with the proper encryption. By doing so, the visiting device can be used to access e-mail via the Internet. Further, the visiting device can also access other parts of the network. The ability to access other parts of the network is often, however, not desirable. Typically, the only way to revoke the visiting user/visiting devices access to the wireless network is by changing the encryption key. This, however, impacts all users on the wireless network, including resident users, and not just the visiting user/device, and requires all other users to update their devices with the new encryption key. This can be inconvenient, time-consuming and expensive.

One possible solution would be to duplicate the wireless network infrastructure, so that a separate (duplicate) wireless network is provided for visiting users/devices, while the primary wireless network is provided for non-visiting users/devices. The duplicate wireless network would require an encryption key that is separate and distinct from the encryption key required by the primary wireless network. A change in the encryption key on the duplicate wireless network would not impact users/devices on the primary wireless network. Duplication of the infrastructure is, however, expensive.

SUMMARY OF THE INVENTION

The present invention provides a system for granting a wireless computing device access to a network.

Briefly described, in architecture, one embodiment of the system, among others, can be implemented as follows. A wireless access point is provided that includes a controller configured to receive data encrypted with encryption key data from a wireless device. The controller is also configured to assign an Internet Protocol (IP) address to the wireless device to identify it on a network, based upon the encryption key data that is used to encrypt the data received from the wireless device. The present invention can also be viewed as providing a method for providing a wireless device access to a network. In this regard, one embodiment of such a method, among others, can be broadly summarized by the following steps: receiving data encrypted with predetermined encryption key data from a wireless computing device via a wireless connection. The encryption key data corresponds to a predetermined user class. An Internet Protocol address is assigned to the wireless computing device that is indicative of the predetermined user class. The IP address is assigned based upon the encryption key data used.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DESCRIPTION OF THE PREFERRED EMBODIMENT

The present invention allows a wireless device to access a host network. There is provided a wireless access point via which wireless devices may be connected to a network. The wireless device is configured to receive from a wireless device data encrypted with predetermined encryption key information. Based upon the encryption key information used to encrypt the data received from the wireless device, the wireless access point assigns an Internet Protocol (IP) address to the wireless device to identify it on the network.

An IP address is an identifier for a computer or device on a TCP/IP network. Networks using the TCP/IP protocol route messages based on the IP address of the destination. The format of an IP address is a 32-bit numeric address written as four numbers separated by periods. Each number can be zero to 255. For example, 1.160.10.240 could be an IP address. On TCP/IP networks, subnets are defined as all devices whose IP addresses have the same prefix. An IP address has two components, the network address and the host address. For example, consider the IP address 150.215.17.9. Assuming this is part of a Class B network, the first two numbers (150.215) represent the Class B network address, and the second two numbers (17.9) identify a particular host on this network.

A subnet is a portion of a network that shares a common address component. For example, all devices with IP addresses that start with "100.100.100." would be part of the same subnet. Dividing a network into subnets is useful for both security and performance reasons. IP networks may be divided using a subnet mask. Subnetting enables the network administrator to further divide the host part of the address into two or more subnets. In this case, a part of the host address is reserved to identify the particular subnet. This is easier to see if we show the IP address in binary format. The full address is:

10010110.11010111.00010001.00001001

The Class B network part is:

10010110.11010111 and the host address is 00010001.00001001

If this network is divided into 14 subnets, however, then the first 4 bits of the host address (0001) are reserved for identifying the subnet. A subnet mask is a filter that selectively includes or excludes certain values. Values that do not conform to the mask cannot be entered. The subnet mask can be used to determine what subnet an IP address belongs to. The subnet mask is the network address plus the bits reserved for identifying the subnetwork. (By convention, the bits for the network address are all set to 1, though it would also work if the bits were set exactly as in the network address.) In this case, therefore, the subnet mask would be 11111111.11111111.11110000.00000000.

Figure 1:
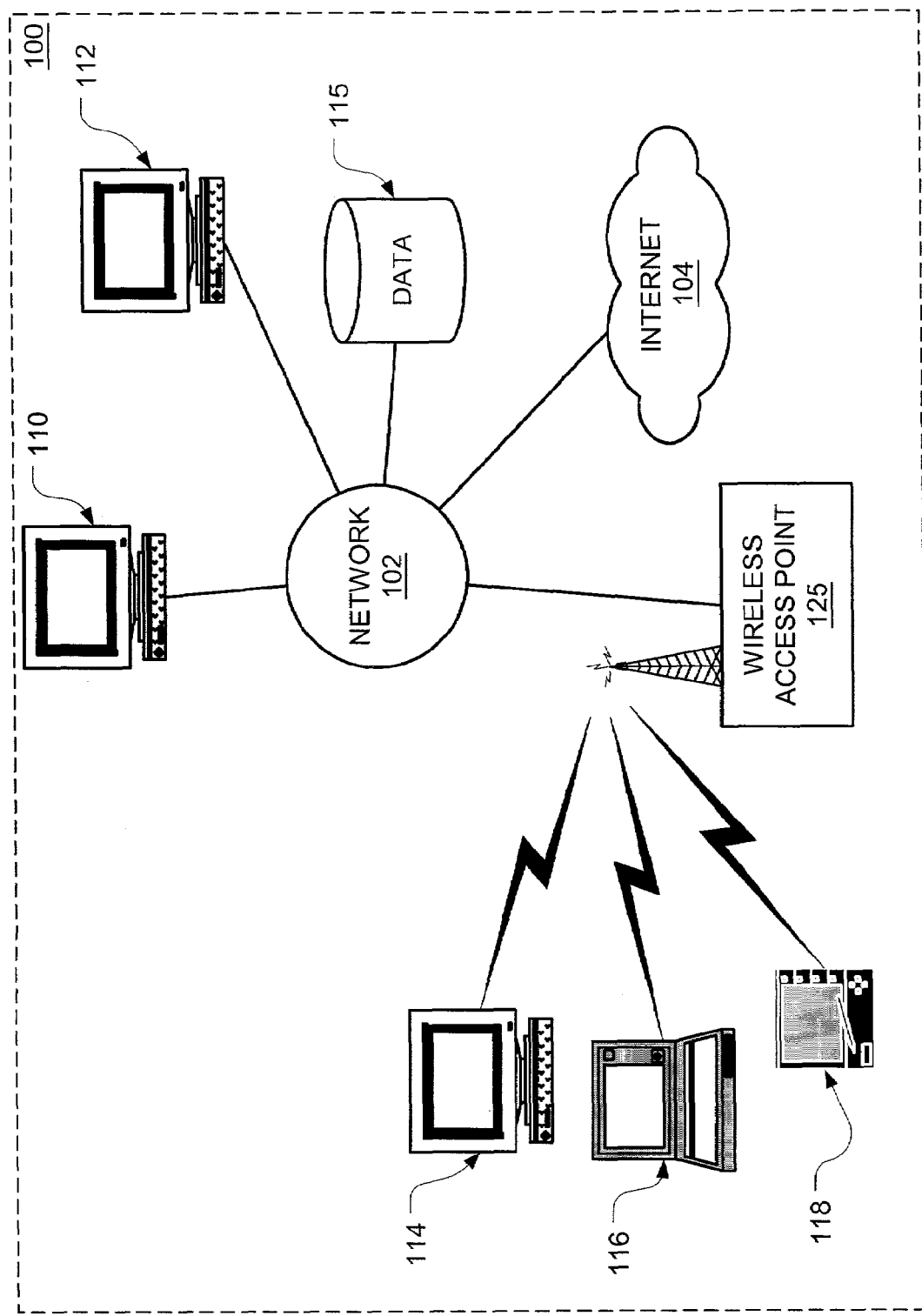
FIG. 1 is a block diagram illustrating a network system 100.

FIG. 1 illustrates a network system 100. Network system 100 includes one or more computing devices that are connected to a network 102. Network 102 may be, for example, an Intranet. In this example, network system 100 includes computing devices 110, 112, 114, 116 and 118. Each of the computing devices 110, 112, 114, 116 and 118 may be implemented as, for example, a computer workstation, personal computer or personal digital assistant (PDA). They may also be implemented as, for example a communications device, such as a cellular telephone. Further they may be portable, mobile or desktop type computing devices. There is also a database 115 and a wireless access point 125. Computing devices 110, 112, 114, 116 and 118 may be referred to as "home devices" as they are not visitor computing devices. Home devices will typically have greater access rights on the network 102 than visitor devices. For example, a home device may have permissions that allow it to access resources on the Intranet as well as the Internet.

All of the computing devices 110, 112, 114, 116 and 118, as well as database 115 and wireless access point 125, are connected to the network 102. Network 102 is preferably configured to allow for access/connection to the Internet 104.

Computing devices 110 and 112 are wired computing devices that are connected to the network 102 via a wired connection that allows for transmission of data from/to the wired computing device. Computing devices 114, 116 and 118 are wireless computing devices that are connected to the network 102 via a respective wireless connection with wireless access point 125. The wireless connection allows for transmission of data from/to the wireless computing devices 114, 116 and/or 118.

Wireless access point 125 is connected to the network 102 via a wired connection, however, it may also be connected to the network via a wireless connection. Wireless access point 125 is configured to exchange data with a wireless computing device via, for example, radio frequency (RF) or Infrared Radiation (IR) signals or the like.

Figure 2:
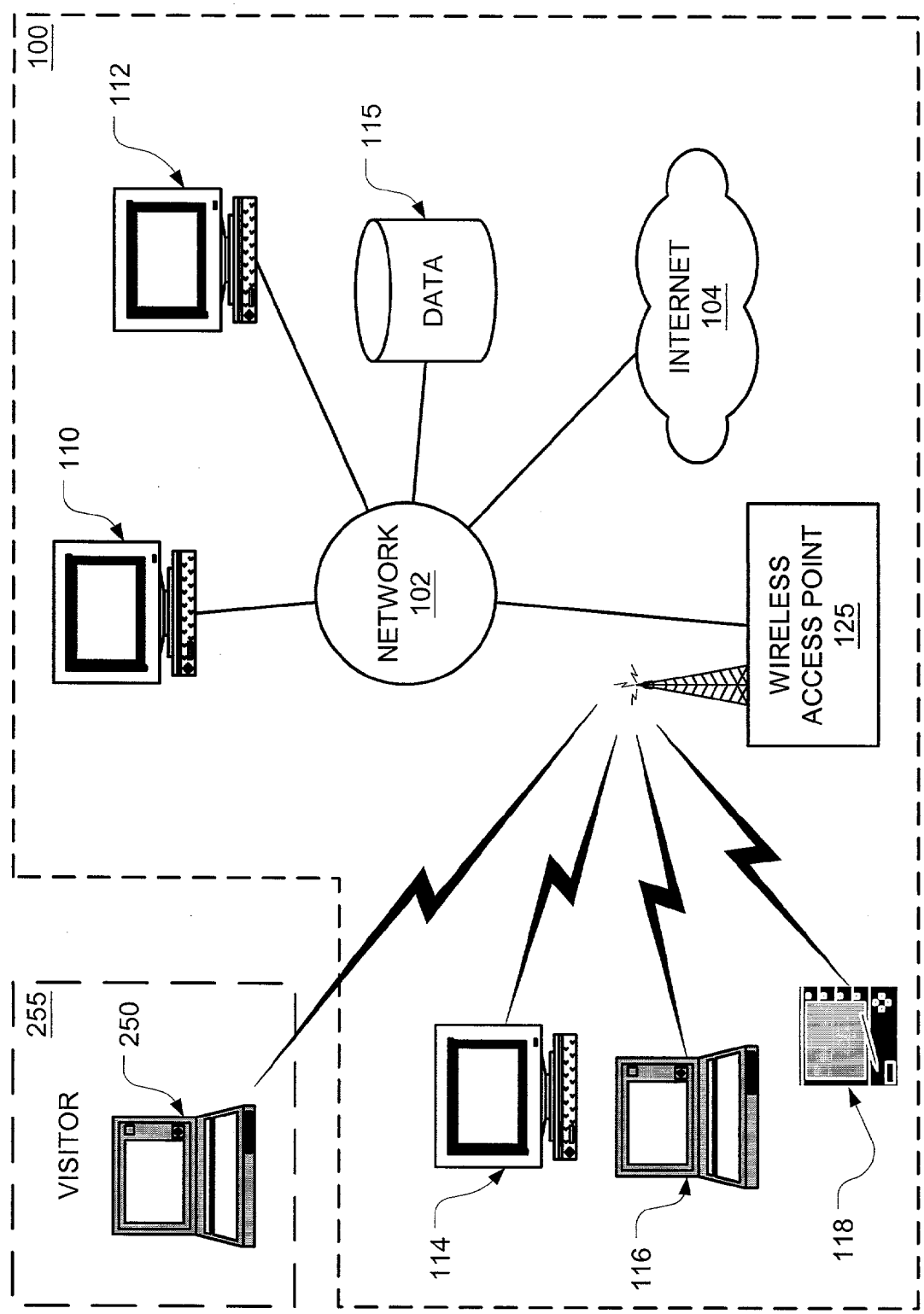
FIG. 2 is a block diagram further illustrating network system 100 and computing device 250.

FIG. 2 is a further illustration of network system 100. In this example, a visiting computing device 250 is provided access to the network 102. Computing device 250 is a visiting computing device (visitor computing device) 255, as it is not typically connected to or a part of network system 100. Computing device 250 is a wireless computing device and is connected to the network 102 via wireless access point 125. Computing device 250 may be implemented as, for example, a computer workstation, personal computer or personal digital assistant (PDA). It may also be implemented as, for example, a communications device, such as a cellular telephone. Further, it may be a portable, mobile or desktop type computing device. Computing device 250 may be viewed as being of a different user class than the computing devices 114, 116 and 118 since it is a visitor computing device and not a home computing device.

With reference to FIG. 2, when a visitor wants to connect to the network 102 via wireless access point 125 with a wireless computing device 250 (visitor computing device), the visitor is provided with encryption key data to allow the visitor computing device 250 to access the network 102 via the wireless access point 125. This encryption key data may be referred to as the visitor encryption key. The visitor encryption key is different from the encryption key data provided to non-visitor wireless computing devices (home computing devices) to allow them to access the network 102 via the wireless access point 125. The encryption key data provided to home devices may be referred to as the home encryption key.

Figure 3:
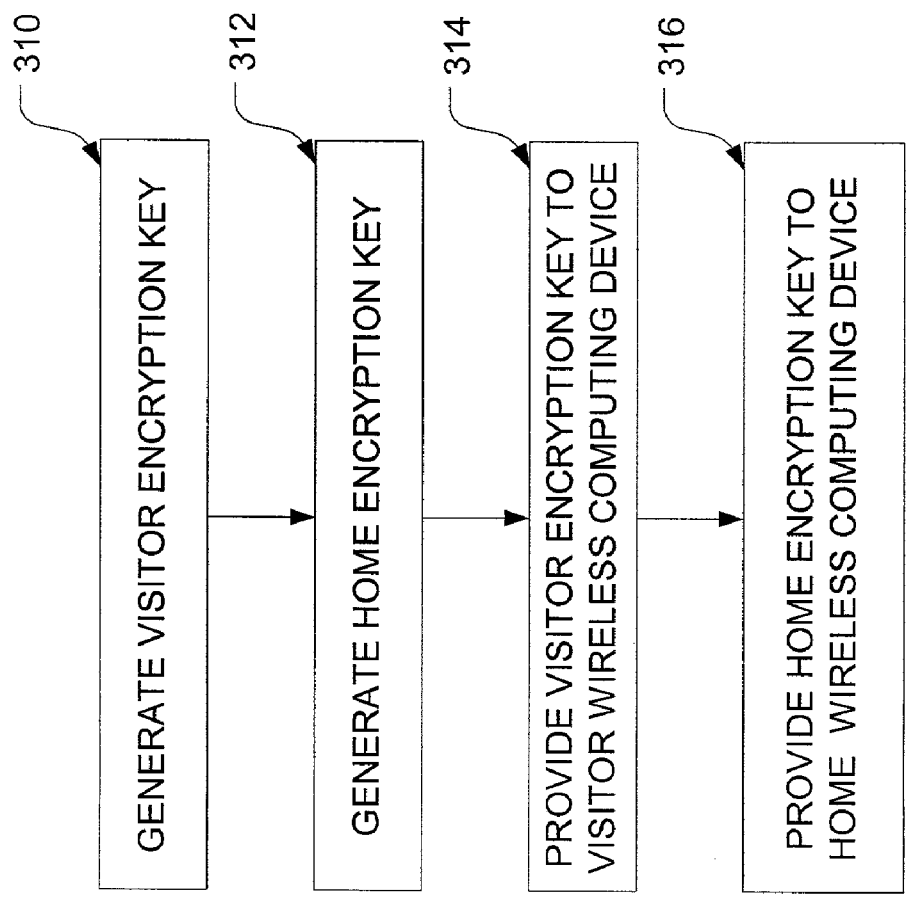
FIG. 3 is a flow chart illustrating the process of providing encryption key data to a computing device.

FIG. 3 shows a flow chart illustrating the process of providing data encrypted with predetermined encryption key data to wireless computing devices. In this example, visitor encryption key data is generated (310). Home encryption key data is generated (312). The visitor encryption key is provided to a wireless visitor device (314) and the home encryption key is provided to one or more wireless home devices (316).

Encryption key data may be manually input into a wireless computing device by the user, for example. Further it may be input into the wireless computing device via introduction of storage media, readable by the wireless computing device, containing the encryption key data. Encryption key data may also be generated by the wireless access point 125 (FIG. 1) and delivered to a wireless computing device via a separate, out-of-band wireless connection. Encryption key data may also be provided to the wireless computing device via other means such as, for example, a wired interface connection that allows for transfer of encryption key data to the wireless computing device. Encryption key data may also be generated by a device other than a wireless access point 125.

Once encryption key data is provided to a wireless computing device, it can be used to encrypt data to be transmitted to the network 102 (FIG. 1) via wireless access point 125. Based upon the encryption key data used to encrypt data transmitted by the wireless computing device, an IP address may be assigned to the wireless device to identify the wireless device on the network 102.

Figure 4:
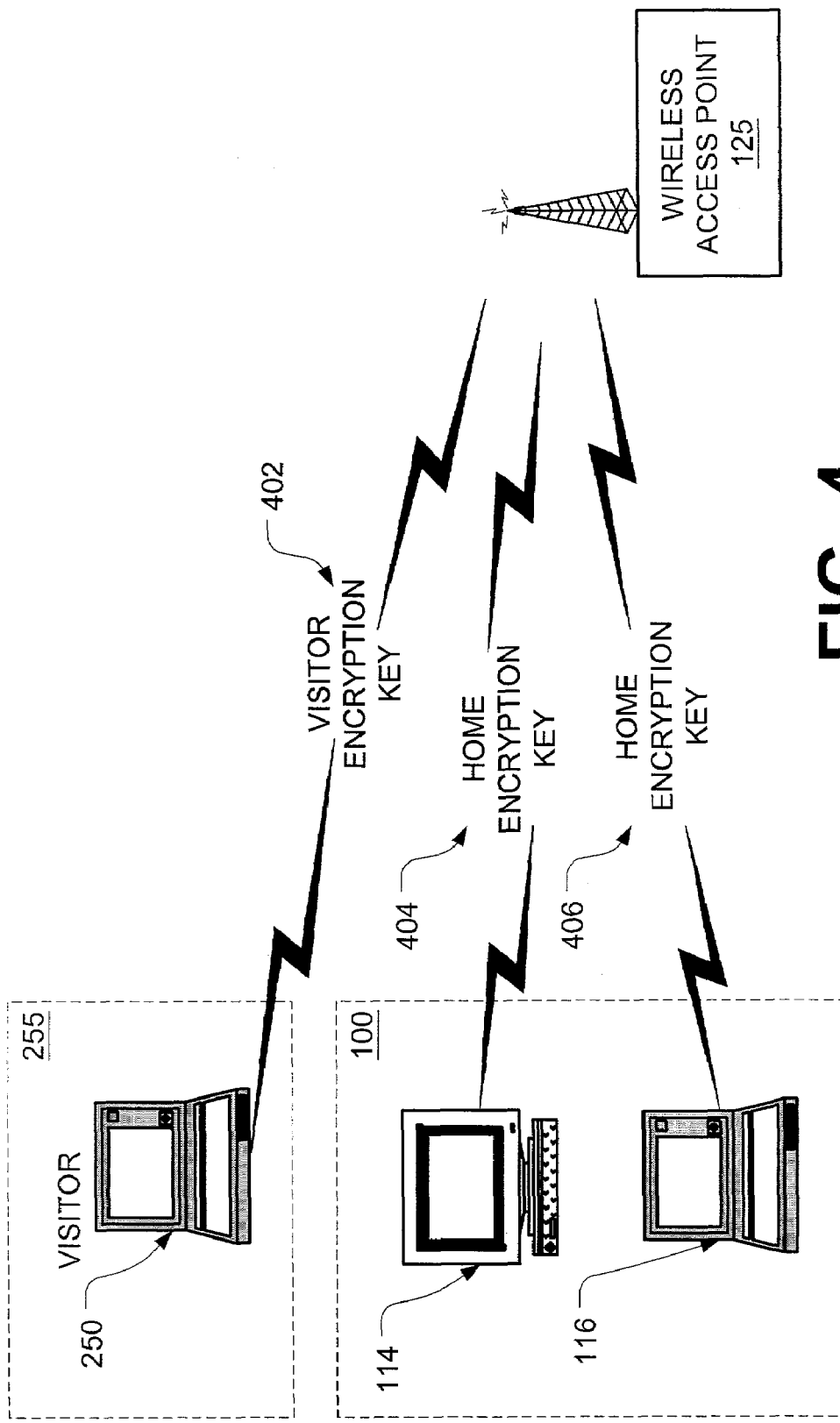
FIG. 4 is a block diagram illustrating the transmission of data, encrypted using encryption key data, from a wireless computing device.

FIG. 4 is a block diagram illustrating the transmission of data encrypted via encryption key data from wireless computing devices to the wireless access point 125. More particularly, FIG. 4 shows that wireless visitor computing device 250 provides data encrypted with a visitor encryption key 402 to the wireless access point 125. Similarly, wireless computing devices 114 and 116 provide data encrypted with other encryption key data to wireless access point 125. However, as wireless computing devices 114 and 116 are home devices (not visiting devices), they each provide data encrypted with home encryption key data to the wireless access point 125. Wireless computing device 114 provides data encrypted with the home encryption key 404 to wireless access point 125 while computing device 116 provides data encrypted with home encryption key 406 to the wireless access point 125. It will be noted that wireless devices 114 and 116 may be configured to encrypt data with the same home encryption key data or it may they may be configured to encrypt data using different home encryption key data. In short, more than one home encryption key may be used by the home wireless computing devices on network system 100.

Figure 5:
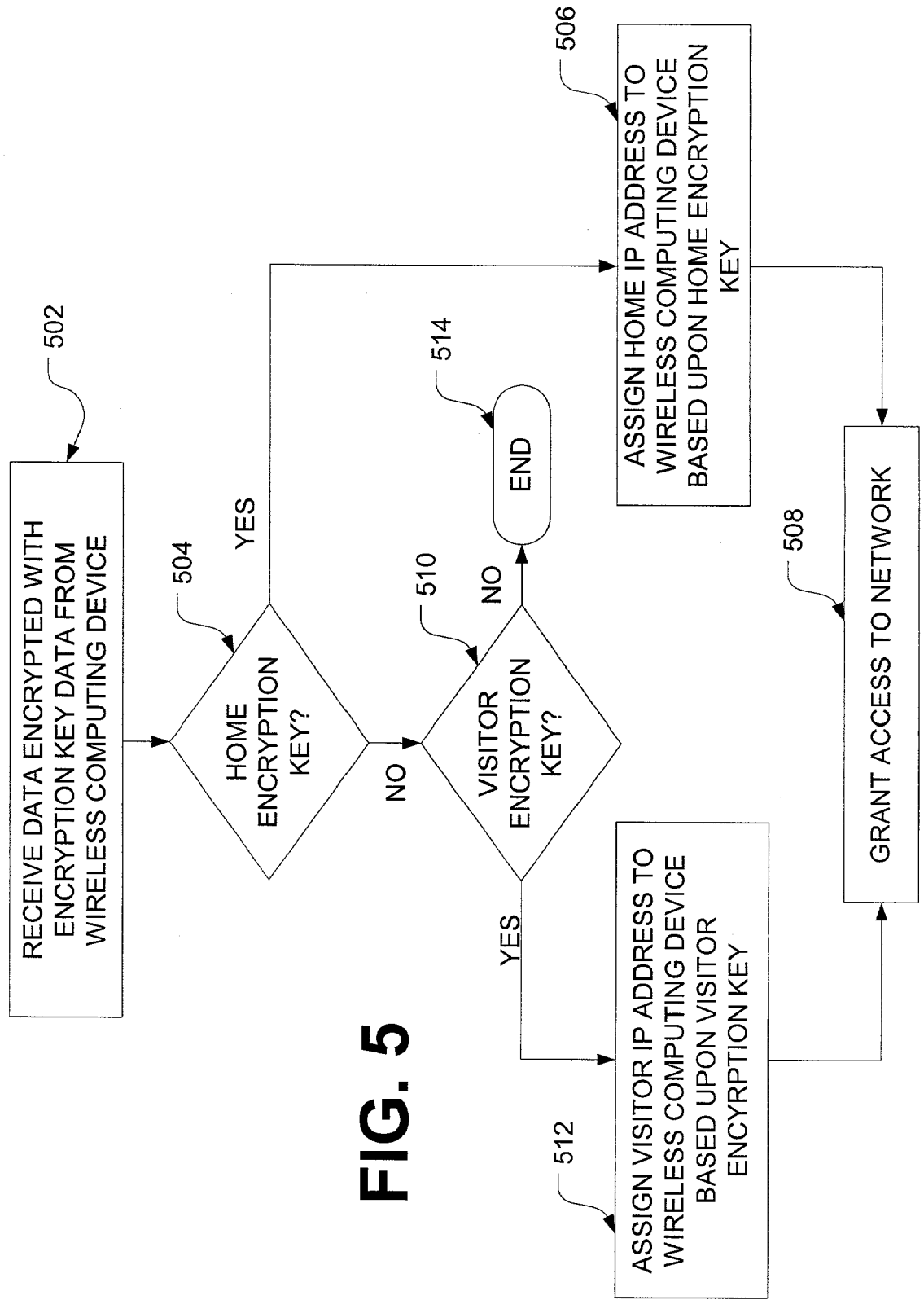
FIG. 5 is a flow chart illustrating the process of assigning an IP address to a wireless computing device.

FIG. 5 shows a flowchart illustrating the process of assigning an IP address to a wireless computing device that is requesting access to the network 102 (FIG. 2). With reference to FIG. 5, it can be seen that data encrypted using encryption key data is received from a wireless computing device (502). It is then determined whether or not the data is encrypted using encryption key data that constitutes a home encryption key (504). If so, the wireless computing device is assigned a home IP address based upon the home encryption key (506) and is granted access to the network (508). On the other hand, if the data is not encrypted using a home encryption key, it is determined whether or not that data is encrypted using a visitor encryption key (510). If not, the process ends (514) and the wireless computing device is not granted access to the network. However, if the data is encrypted using encryption key data that does constitute a visitor encryption key, then the wireless computing device is assigned a visitor IP address to identify it on the network, based upon the visitor encryption key (512). The visiting computing device is then granted access to the network (508). The extent to which the visiting computing device can access network resources may be restricted. Those network resources that a visiting computing device is allowed to access may be referred to as visitor resources. Permissions may be set for each resource.

Figure 6:
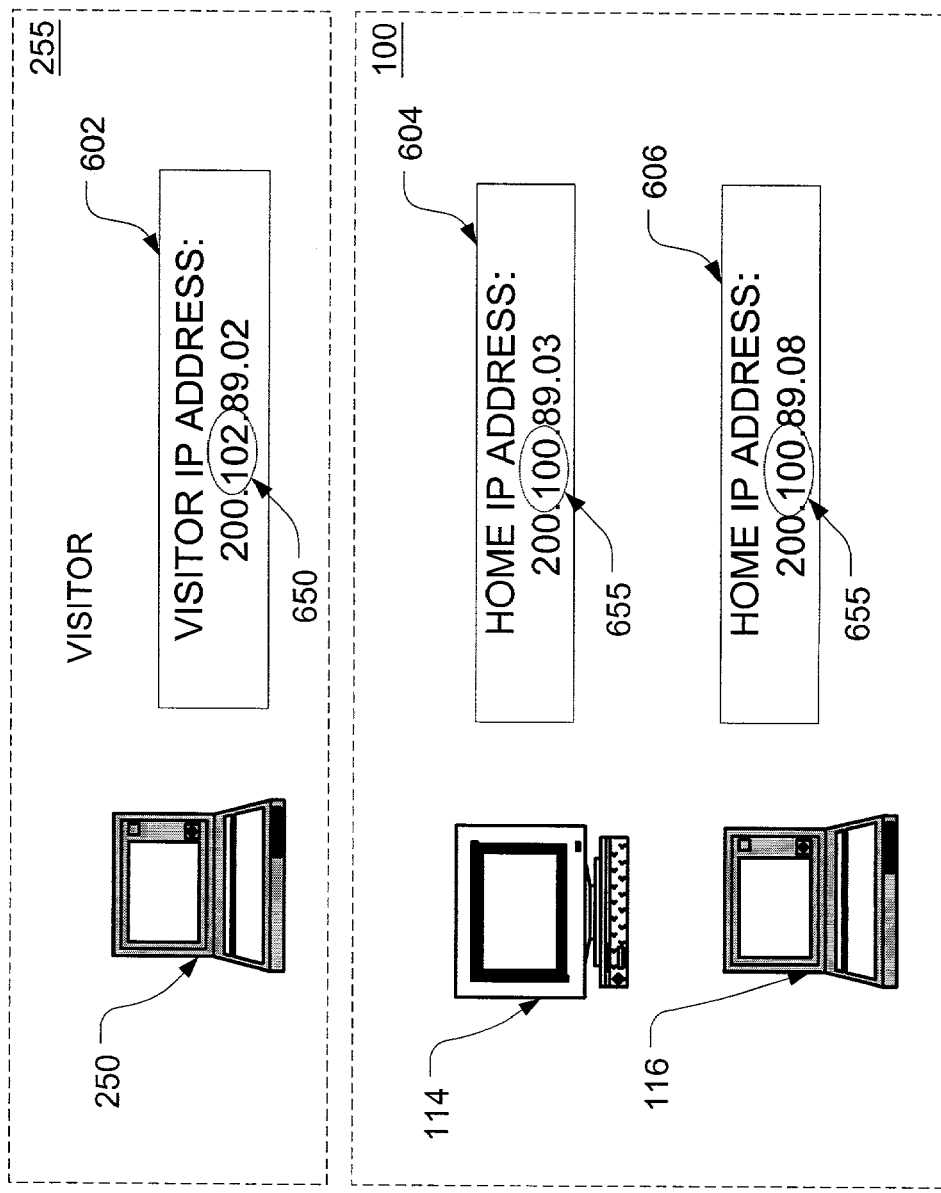
FIG. 6 is diagram further illustrating the assignment of an IP address to a wireless communications device.

FIG. 6 further illustrates the assignment of IP addresses to wireless computing devices. In this example, visitor wireless computing device 250 is assigned a visitor IP address 602. Similarly, home wireless computing devices 114 and 116 are assigned home IP addresses 604 and 606, respectively. It will be noted that the visitor IP address 602 is distinguished from home IP addresses 604 and 606 via the second digit (650 and 655) of the IP addresses 602, 604 and 606. It can be seen that the second digit 650 of IP address 602 is the number "102" while the second digit 655 of IP addresses 604 and 606 is "100". In short, the second digit of the visitor IP address 602 is "102" and identifies the wireless computing device 250 as a visitor computing device while the second digit of IP addresses 604 and 606 is "100" and identifies the wireless computing devices 114 and 116 as home wireless computing devices.

It will be recognized that other digits of the IP address could also be used to distinguish visitor versus home devices, including, for example the third number or second and third numbers together. Further, it will be recognized that access to resources on the network 102 can be controlled/restricted by setting permissions for IP addresses. For example, a permission could be set that would allow IP addresses wherein the second number is "102" to access only the Internet 104 via the network 102. Similarly, permissions could be set that would allow IP addresses wherein the second number is "100" to have full access to all resources on the network 102, including, but not limited to, the Internet 104.

Figure 7:
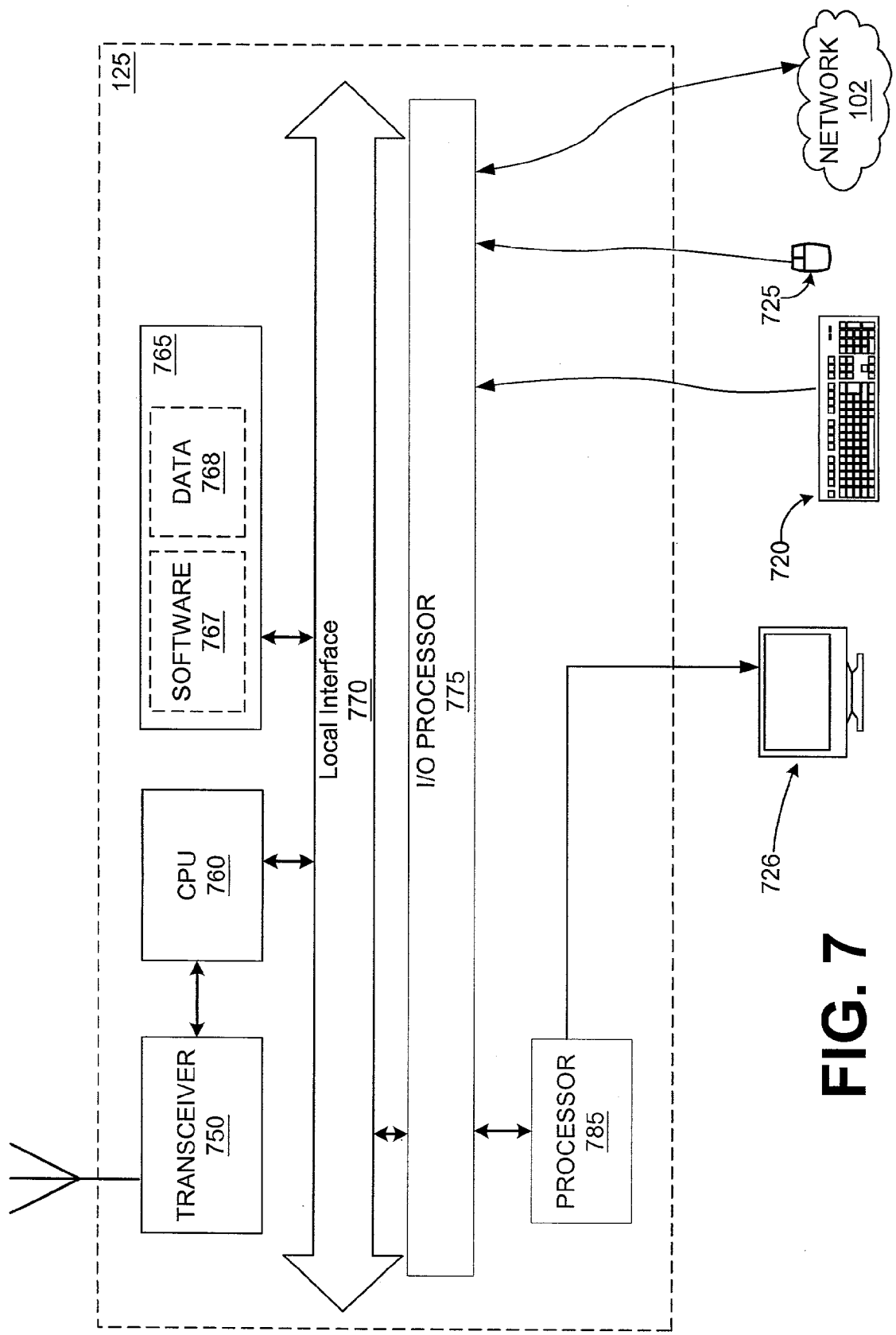
FIG. 7 is a block diagram illustrating an embodiment of wireless access point 125.

FIG. 7 is a block diagram of an embodiment of wireless access point 125 according to the present invention. This embodiment includes a central processing unit 760, storage memory 765 for storing data 768 and/or software 767. An input/output (I/O) processor 775 is provided for interfacing with associated input and output devices. A local interface 770 is provided for transferring data between the CPU 760, memory 765 and/or I/O processor 775. A processor 785 is provided for processing graphics data and outputting to a display device 726. Associated input and output devices may include keyboard device 720, mouse/pointing device 725 and/or a network 102. Network 102 may be a local area network (LAN) or a wide area network (WAN) such as, for example, the Internet.

CPU 760 is preferably configured to operate in accordance with software 767 stored on memory 765. CPU 760 is preferably configured to control the operation of wireless access point 125 so that data encrypted using encryption key data may be received from a wireless computing device and evaluated to determine the nature of the encryption key data. Further, it is also preferably configured to assign an IP address to the wireless computing device based upon the encryption key data used to encrypt the data. Software 767 may include software configured to cause CPU 760 to perform the process described by the flowcharts of FIG. 3 and FIG. 5. Wireless access point 125 may be configured to carry out the functions and operations of a firewall for protecting the network 102 from unauthorized access. This firewall may be, for example, a Network Address Translation (NAT) compliant firewall. In one embodiment, wireless access point 125 is compliant with the specification of IEEE standard 802.

The processor 785, and/or CPU 760 of the present invention can be implemented in hardware, software, firmware, or a combination thereof. In the preferred embodiment(s), the processor 785 is implemented in software or firmware that is stored in a memory and that is executed by a suitable instruction execution system. If implemented in hardware, as in an alternative embodiment, the processor 785 and/or CPU 760 can be implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc. Processor 785 may be implemented as a general-purpose processor, such as, for example the Intel® Pentium IV central processing unit. Further, processor 785 may be implemented as a graphics processor or a digital signal processor (DSP). The processor 785 may be configured to incorporate or otherwise carry out the functions of CPU 760. CPU 760 may also be configured to incorporate or otherwise carry out the functions of processor 785.

The software 767 comprises a listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer-readable medium can be, for example, but not limited to, an electronic, magnetic, optical, electromagnetic, infrared, or semiconductor system, apparatus or device. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

The flow charts of FIG. 3 and FIG. 5 show the architecture, functionality, and operation of a possible implementation of control software that may be stored on memory 765 (FIG. 7) as software 767. In this regard, each block represents a module, segment, or portion of code, which comprises one or more executable instructions for implementing the specified logical function(s). It should also be noted that in some alternative implementations, the functions noted in the blocks may occur out of the order noted in FIG. 3 or FIG. 5. For example, two blocks shown in succession in FIG. 3 or FIG. 5 may in fact be executed substantially concurrently or the blocks may sometimes be executed in the reverse order, depending upon the functionality involved, as will be further clarified herein below. It will be recognized that the functionality and operations described in FIG. 3 or FIG. 5, or portions thereof, could also be implemented in hardware via, for example, a state machine.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method of granting network access to a wireless computing device, said method comprising the steps of:
   receiving data encrypted using predetermined encryption key data from a wireless computing device via a wireless connection;
   said encryption key data corresponds to a predetermined user class; and
   assigning an Internet protocol (IP) address to said wireless computing device that is indicative of said predetermined user class, based upon said encryption key data.

2. The method of claim 1, further comprising the step of granting said wireless computing device access to a visitor resource, where said IP address corresponds to a visitor computing device, said visitor resource comprises a network resource that is accessible to the visitor computing device.

3. The method of claim 1, further comprising the step of granting said wireless computing device access to a home resource, where said IP address corresponds to a home computing device, said home resource comprises a network resource that is accessible by the home computing device.

4. The method of claim 2, wherein said visitor resource comprises the Internet.

5. The method of claim 3, wherein said home resource comprises an Intranet.

6. The method of claim 5, wherein said home resource further comprises the Internet.

7. The method of claim 1, wherein said user class corresponds to a visitor computing device.

8. The method of claim 1, wherein said IP address determines the extent to which said wireless computing device is allowed access to resources on said network.

9. A wireless access point configured to receive data, encrypted using predetermined encryption key data that corresponds to a predetermined user class, from a wireless device and to assign an Internet Protocol (IP) address based on the predetermined encryption key data to said wireless device to identify the wireless device on a network, the IP address indicative of the predetermined user class.

10. The wireless access point according to claim 9, further comprising:
    a controller configured to receive the data and to assign the IP address.

11. The wireless access point of claim 10, further comprising memory for storing software instructions for controlling the operation of said controller.

12. The wireless access point of claim 10, further comprising a wireless transceiver for exchanging data with the wireless device.

13. A wireless access point comprising:
    a controller;
    a memory;
    a wireless transceiver for exchanging data with a wireless computing device;
    a connector for connecting to a network; and
    wherein said controller is configured to receive data, encrypted using predetermined encryption key data that corresponds to a predetermined user class, from said wireless computing device and to assign an Internet Protocol (IP) address to said wireless computing device based on the predetermined encryption key data to identify said wireless computing device on said network, the IP address indicative of the predetermined user class.

14. The wireless access point of claim 13, wherein said wireless computing device comprises a visitor computing device.

15. The wireless access point of claim 14, wherein said controller is further configured to assign a visitor IP address to said visitor computing device where said encryption key data comprises a visitor encryption key.

16. The wireless access point of claim 13, wherein said wireless computing device comprises a borne computing device.

17. The wireless access point of claim 16, wherein said controller is further configured to assign a home IP address to said borne computing device where said encryption key data comprises a home encryption key.

18. The wireless access point of claim 13, wherein said controller is further configured to provide a firewall to said network.

19. A method of granting network access to a wireless computing device, said method comprising the steps of:

receiving data encrypted using predetermined encryption key data from a wireless computing device via a wireless connection;
determining whether the encryption key data is a visitor encryption key or a home encryption key; and
assigning an Internet protocol (IP) address to said wireless computing device based upon said encryption key data,
wherein assigning the IP address comprises assigning a visitor IP address to the wireless computing device in response to determining that the encryption key data is a visitor encryption key, and
wherein assigning the IP address comprises assigning a home IP address to the wireless computing device in response to determining that the encryption key data is a home encryption key.

20. The method of claim 19, wherein the visitor IP address contains at least a first predetermined digit to identify the wireless computing device as a visitor wireless computing device, and the home IF address contains at least a second predetermined digit, different from the first predetermined digit, to identify the wireless computing device as a home wireless computing device.

21. A wireless access point configured to receive data, encrypted using predetermined encryption key data, from a wireless device and to assign an Internet Protocol (IP) address based on the predetermined encryption key data to said wireless device to identify the wireless device on a network, the wireless access point further configured to:
determine whether the encryption key data is a visitor encryption key or a home encryption key,
wherein the assigned IP address is a visitor IP address in response to the encryption key data being a visitor encryption key, and
wherein the assigned IP address is a home IP address in response to the encryption key data being a home encryption key.

22. A wireless access point comprising:
a controller:
a memory;
a wireless transceiver for exchanging data with a wireless computing device:
a connector for connecting to a network; and
wherein said controller is configured to receive data, encrypted using predetermined encryption key data, from said wireless computing device and to assign an Internet Protocol (IP) address to said wireless computing device based on the predetermined encryption key data to identify said wireless computing device on said network, wherein the controller is configured to further:
determine whether the encryption key data is a visitor encryption key or a home encryption key,
wherein the assigned IP address is a visitor IP address in response to the encryption key data being a visitor encryption key, and
wherein the assigned IP address is a home IP address in response to the encryption key data being a home encryption key.

23. A computer-readable medium containing instructions that when executed cause a system to:
receive, from a wireless computing device, data encrypted using encryption key data;
determine whether the encryption key data is a visitor encryption key or a home encryption key;
in response to determining that the encryption key data is a visitor encryption key, assign a visitor Internet Protocol (IP) address to the wireless computing device; and
in response to determining that the encryption key data is a home encryption key, assign a home IP address to the wireless computing device, the home IP address being different from the visitor IP address.

24. The computer-readable medium of claim 23, wherein each of the visitor IP address and home IP address contains plural digits, at least one digit in the visitor IP address being different from a corresponding at least one digit in the home IP address.

* * * * *

UNITED STATES PATENT AND TRADEMARK OFFICE
CERTIFICATE OF CORRECTION

PATENT NO. : 7,362,865 B2  Page 1 of 1
APPLICATION NO. : 10/122511
DATED : April 22, 2008
INVENTOR(S) : Alan H. Karp It is certified that error appears in the above-identified patent and that said Letters Patent is hereby corrected as shown below:

In column 8, line 57, in Claim 16, delete "borne" and insert -- home --, therefor.

In column 8, line 61, in Claim 17, delete "borne" and insert -- home --, therefor.

In column 9, line 19, in Claim 20, delete "IF" and insert -- IP --, therefor.

In column 10, line 2, in Claim 22, delete "device:" and insert -- device; --, therefor.

Signed and Sealed this

Nineteenth Day of August, 2008

JON W. DUDAS
*Director of the United States Patent and Trademark Office*